April 26, 1949.  R. B. BRIDGES  2,468,653
DYNAMIC BRAKING CONTROL
Filed Jan. 10, 1948  2 Sheets-Sheet 1

Inventor
Robert B. Bridges
By
Attorney

April 26, 1949.  R. B. BRIDGES  2,468,653
DYNAMIC BRAKING CONTROL
Filed Jan. 10, 1948  2 Sheets-Sheet 2

Patented Apr. 26, 1949

2,468,653

UNITED STATES PATENT OFFICE 2,468,653

DYNAMIC BRAKING CONTROL

Robert Bruce Bridges, Wauwatosa, Wis., assignor to Cutler-Hammer, Inc., Milwaukee, Wis., a corporation of Delaware Application January 10, 1948, Serial No. 1,616

12 Claims. (Cl. 318—368)

This invention relates to a method of and means for improving dynamic braking characteristics of direct current motors.

Various systems of control affording dynamic braking of direct current motors following interruption of power have been devised. The dynamic braking action provided by all such systems heretofore used is initially high but diminishes rapidly during motor slow down. Maintenance of a high degree of braking action throughout the period of motor slow downwould be highly desirable.

The present invention has as its primary objective to provide a system of dynamic braking for such motors affording a high degree of braking action during slow down.

Another object is to provide a dynamic braking system of the aforementioned type which is adaptable to single or multi motor drives.

Other objects and advantages of the invention will hereinafter appear.

Figure 1:
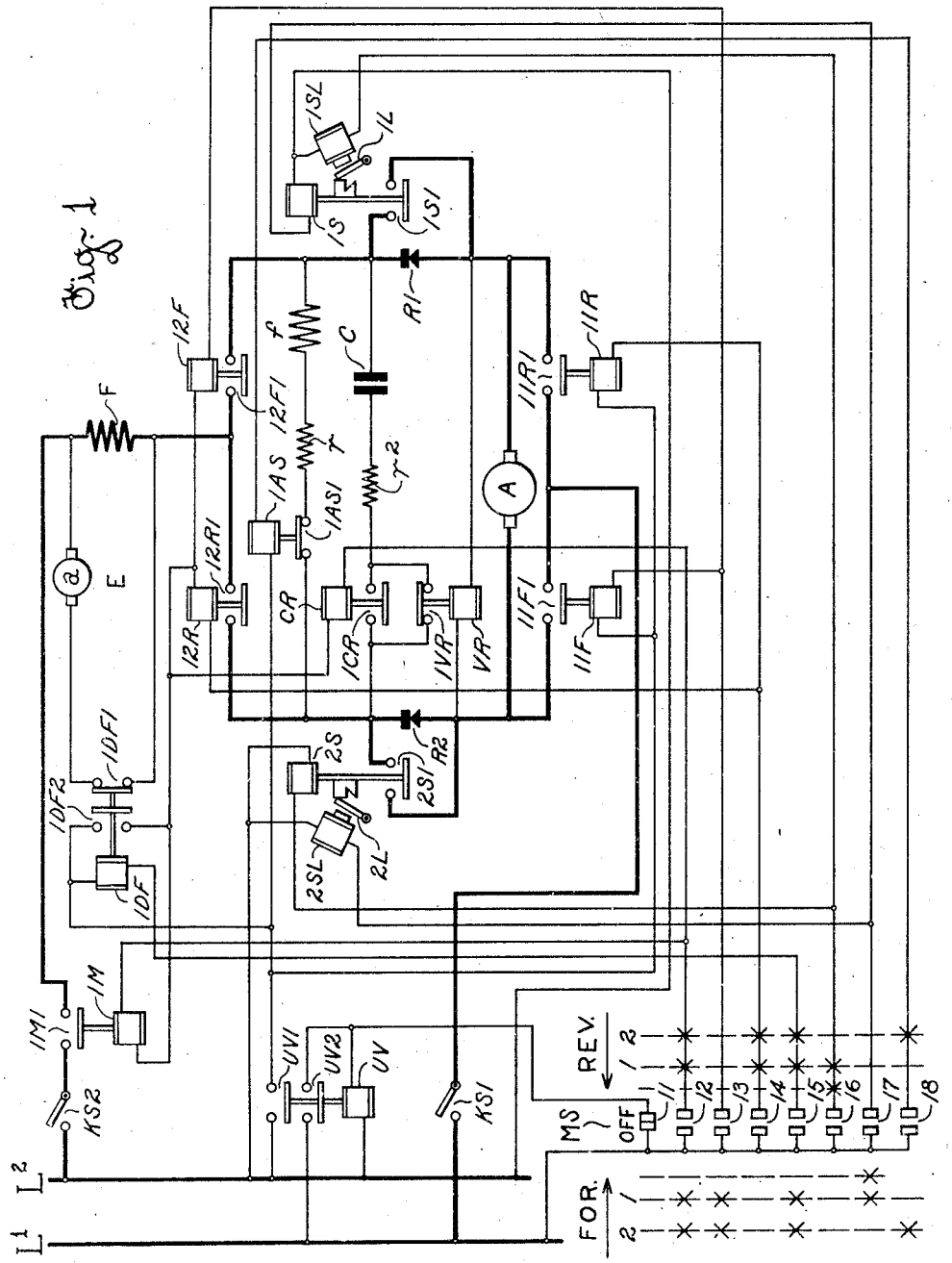
Figure 1 shows a control system for a motor.

Referring to Fig. 1, generally considered it shows a control system for a direct current motor which is similar to that disclosed in the application of John M. Newman and Edwin W. Seeger, Serial No. 693,497, filed August 28, 1946, and assigned to the assignee of the present application. It will be noted that the showing of Fig. 1 lacks the accelerating resistors, commutating means therefor and commutating means for effecting plugging connections which are disclosed in the aforementioned application. Inasmuch as these control elements are well known they are deleted from the present application to facilitate an understanding of the same. It will be apparent to those skilled in the art how these elements may be incorporated with the present system of control as desired.

More particularly Fig. 1 shows a motor provided with an armature A and a series field winding F. The motor is provided with a set of direction controlling switch contacts IIFI, I2FI, IIRI and I2RI which provide for reversal of the flow of armature current. The motor is supplied with current from lines $L^1$ and $L^2$ through the knife switches KS1 and KS2 and through main switch contacts IMI. All of the aforementioned switch contacts are of the normally disengaged type.

All of the aforementioned switch contacts are provided with individualized electromagnetic operating windings. Thus main switch contacts IMI are provided with an operating winding IM and switch contacts IIFI, I2FI, IIRI and I2RI which are respectively provided with individualized windings IIF, I2F, IIR and I2R.

In addition the control system comprises an exciter E having an armature $a$, and a field winding $f$ included in the dynamic braking connection for the motor armature A. More particularly exciter field winding $f$ is connected across motor armature A by switch contacts IASI through a resistor $r$. The exciter armature $a$ is adapted to be connected by switch contacts IDFI in a closed loop with the field winding F in a series relation such that the current delivered by the exciter traverses the motor field winding in the same direction that the current traverses it during power operation of the motor in either direction. Thus assuming the exciter armature to be suitably driven, as by motor A—F the arrangement illustrated provides for energization of the exciter field winding by the dynamic braking current delivered by motor armature A and said exciter delivers current to the motor field winding F for dynamic braking. Here it will be noted that contacts IDFI and IASI are respectively provided with individualized electromagnetic operating windings IDF and IAS.

It will be noted that the portion of the control system thus far described is the same as that disclosed in the aforementioned application exclusive of the accelerating and plugging control means aforementioned. The present control system in addition preferably comprises a condenser C and a current limiting resistor $r^2$ which are adapted to be connected in series with the exciter field winding $f$ at a certain point in the dynamic braking cycle of the motor in either direction. Normally disengaged contacts ICR are adapted to connect the condenser C and the resistor $r^2$ in a shunt relation to the motor armature A for charging of the condenser during power operation of the motor in either direction and as will be later more fully explained normally engaged contacts IVR together with contacts IASI are adapted to connect the condenser C and the resistor $r^2$ in a closed loop with the exciter field $f$ at a predetermined time following the initiation of dynamic braking operation of the motor. Contacts ICR and IVR are provided with individualized electromagnetic operating windings CR and VR respectively. It will be noted that the latter winding is connected across the motor armature A and is adapted to be energized when the potential difference across the latter rises above a certain value.

Additionally rectifiers R1 and R2 are interposed in the connections between the motor armature A, the condenser C and resistor $r^2$ to insure that the condenser will not discharge through the motor armature during dynamic braking operation of the motor in either direction. Normally disengaged switch contacts 1S1 are adapted when engaged to provide a shunt path around the rectifier R1 during dynamic braking operation of the motor following power operation of the latter in the forward direction. Similarly normally disengaged contacts 2S1 are adapted when engaged to provide a shunt path around the rectifier R2 during dynamic braking operation of the motor following power operation of the latter in the reverse direction.

The contacts 1S1 are provided with an individualized electromagnetic operating winding 1S, a mechanical latch 1L and an electromagnetic release winding 1SL which is adapted when energized to effect release of the latch 1L. Similarly switch contacts 2S1 are provided with an individualized electromagnetic operating winding 2S, a mechanical latch 2L and an electromagnetic release winding 2SL which is adapted when energized to effect release of the latch 2L. As will be apparent following energization of their respective electromagnetic operating windings, switch contacts 1S1 and 2S1 will be latched in engaged position by their respective latches 1L and 2L. To effect return of contacts 1S1 and 2S1 to their disengaged condition it is necessary that their respective electromagnetic operating windings be deenergized and that their respective latch release windings 1L and 2L be energized. The conditions under which the aforedescribed operation of the switch contacts 1S1 and 2S1 occur will be later more fully explained.

Also the control system illustrated in Fig. 1 provides for disconnection of the motor from the supply circuit and for dynamic braking upon failure of voltage. A failure in voltage results in drop out of a relay UV and this effects release and reengagement of contacts 1AS1 and 1DF1 and release and disengagement of contacts 1M1, 1CR, 1DF2, UV1 and UV2 in addition to release of the direction controlling power contacts aforedescribed.

A master switch MS is provided for controlling the operation of the motor and may be of any preferred form. As shown in Fig. 1 it comprises contacts 11 which are engaged in the off position of said switch and contacts 12, 13, 14, 15, 16, 17 and 18 all of which are disengaged in the off position. Contacts 11 when engaged connect winding UV across lines $L^1$, $L^2$ and said winding when responding engages contacts UV1 and also auxiliary contacts UV2. Contacts UV2 complete a maintaining circuit for winding UV shunting master switch contacts 11; the latter contacts being disengaged in all positions of the master switch other than the off position. Master switch MS is shown as having only 2 forward operating positions and a like number of operating positions for the reverse direction although any number of additional positions in the forward and reverse directions may be provided as desired; such additional positions being dispensed with in the present disclosure to simplify the understanding of the control system. Contacts 12 to 18 are adapted to be engaged in all positions indicated by crosses, whereas they remain open in all other positions of the master switch. Thus contacts 12 are closed in all running positions to connect the main switch winding 1M and winding CR in parallel across lines $L^1$, $L^2$ through normally disengaged contacts 1DF2 and UV1. Accordingly the main switch and the switch CR are responsive only if the low voltage relay UV is closed and only if the winding 1DF has responded to engage contacts 1DF2. It will be noted that when winding 1DF is energized contacts 1DF1 disengage thereby isolating the exciter armature $a$ from the motor field F. Incidentally master switch contacts 15 are also engaged in all running positions of the master switch and when engaged connect winding 1DF across lines $L^1$, $L^2$ through the low voltage relay contacts UV1. Master switch contacts 13 are engaged in all forward positions of the master switch and when engaged connect direction switch windings 11F and 12F across lines $L^1$, $L^2$ in parallel with one another and with the switch windings 1M and CR. Master switch contacts 14 are closed in all reverse operating positions and when engaged connect direction switch windings 11R and 12R across lines $L^1$, $L^2$ in parallel with one another and with the switch windings 1M and CR. Master switch contacts 16 are engaged in the first and intermediate position between off and the first position in reverse operation of the master switch and when engaged connect the operating switch winding 2S and the latch release winding 1SL across the lines $L^1$, $L^2$. Master switch contacts 17 are engaged in the first and intermediate position between off and the first position in forward operation of the master switch and when engaged connect the operating switch windings 1S and the latch release winding 2SL across the lines $L^1$, $L^2$ in parallel with one another. Contacts 18 of the master switch are engaged in the second forward and reverse positions and when engaged connect winding 1AS across the lines $L^1$, $L^2$ through the contacts UV1.

Description of operation of the system to afford power operation of the motor in the forward and reverse directions will be dispensed with inasmuch as this has been fully covered in the aforementioned application.

The operation of the control system to afford dynamic braking of the motor will now be described. Assume that the master switch MS is initially in the second forward operating position and that the motor accordingly has been running in the forward direction. Then assume that the master switch is moved to the off position. As the latter is moved through the first forward position windings 1S and 2SL will be energized due to the engagement of contact 17 of the master switch. Accordingly contacts 1S1 will engage and will be mechanically latched in engaged position by the latch 1L and the contacts 2S1 which were previously latched in engaged condition will be released due to the release of the latch 2L which is effected by energization of the winding 2SL. When the master switch reaches the off position operating windings 1M, CR, 11F, 12F, 1DF and 1AS will be deenergized and accordingly contacts 1M, 1CR, 1DF2, 11F and 12F will be disengaged while contacts 1DF1 and 1AS1 will be engaged. Immediately following the return of the master switch to the off position the contacts 1VR will be maintained in disengaged position.

It will be apparent that following such operation of the master switch MS dynamic braking connections for the motor will be established and are of the type disclosed in the aforementioned application. The motor armature A will be connected in a closed loop with rectifier R2, engaged contacts IASI, resistor $r^2$, exciter field $f$ and engaged contacts ISI. Also the motor field F will be connected in a separate closed loop with the exciter armature $a$ through engaged contacts IDFI.

Upon establishment of the above dynamic braking connections the speed of the motor will initially decrease at a rapid rate due to a high degree of braking action. As the speed of the motor decreases the dynamic braking voltage across the motor armature decreases and consequently the current supplied to the exciter field decreases in direct relation thereto. Likewise the speed of the exciter decreases in a direct relation to speed of the motor and because of the drop in voltage of current supplied to its field $f$ the current supplied to the motor field F by the exciter armature $a$ decreases. Consequently thereafter the braking action diminishes rapidly and as the motor speed approaches zero little braking action remains.

The present system of control, however, provides for a subsequent increase in dynamic braking action when the speed of the motor decreases below a certain value. When the motor speed decreases below said value the winding VR becomes deenergized due to decrease in the dynamic braking voltage across motor armature A and the contacts IVR reengage. Thereupon the condenser C which was charged during power operation of the motor is placed in series with the engaged contacts IVR and IASI, the resistor $r^2$ and the exciter field $f$. The condenser then discharges and supplements the decreasing dynamic braking voltage across the motor armature A. Consequently the voltage across the exciter field $f$ increases rapidly thereby to effect a corresponding increase in the field flux. As a result armature $a$ of the exciter supplies increased current to the motor field F and increased dynamic braking action of the motor obtains.

Figure 2:
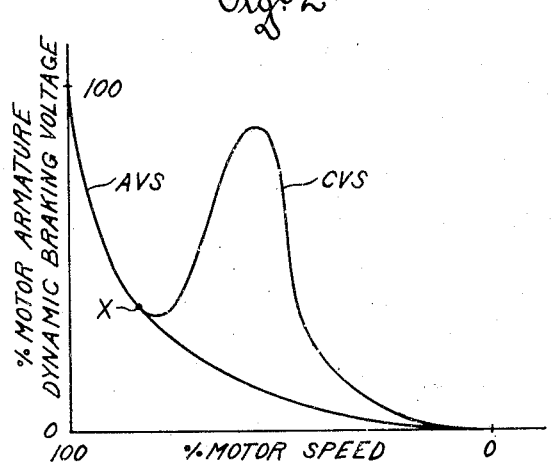
Fig. 2 shows performance characteristics of the motor obtained during dynamic braking operation.

Referring to Fig. 2 it shows a characteristic curve AVS depicting the change in motor armature dynamic braking voltage with respect to change in speed of the motor during dynamic braking operation in conventional systems of control. The characteristic curve CVS starting at the point of intersection X with the curve AVS depicts the change in motor armature dynamic braking voltage effected by discharge of the condenser C through the exciter field as provided for in the present system of control. More particularly in the present system of control the motor armature dynamic braking voltage speed relationship will follow the curve AVS to the point X and then will follow the curve CVS the instant the condenser C discharges through the exciter field.

Figure 3:
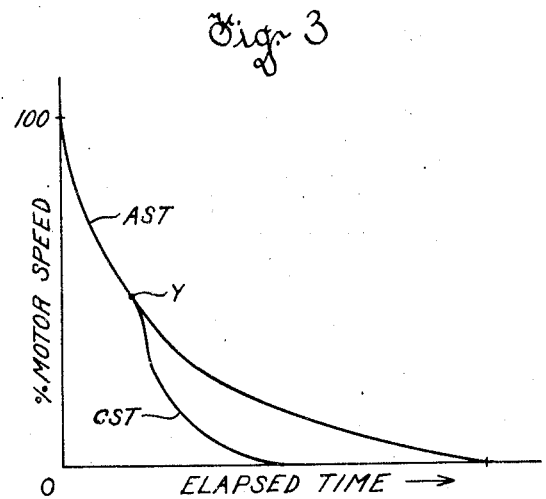
Fig. 3 shows another type of performance characteristics of the motor obtained during dynamic braking operation.

Referring to Fig. 3 it shows a characteristic curve AST depicting the change in motor speed with respect to elapsed time during dynamic braking operation obtained with conventional systems of control. The characteristic curve CST starting at the point of intersection $y$ with the curve AST depicts the change of motor speed with respect to time effected by discharge of the condenser C through the exciter field as provided for in the present system of control. More particularly in the present system of control the motor speed-time relationship will follow initially the curve AST to the point Y and then will follow the curve CST. It will be apparent that the present system of dynamic braking control provides for stopping the motor in a shorter elapsed time.

The present system of dynamic braking control affords the same control when the motor has been running in the reverse direction prior to the establishment of dynamic braking connections. Assume that the master switch MS is in the second reverse operating position and that the motor accordingly has been running in the reverse direction. Then assume that the master switch is moved to the off position. As it is moved through the first reverse operating position operating windings 2S and ISL will be energized due to the engagement of contacts 16 of the master switch. Accordingly contacts 2SI will engage and will be mechanically latched in engaged condition by the latch 2L and the contacts ISI which were previously latched in engaged condition will be disengaged due to release of latch IL effected by energization of the operating winding ISL. When the master switch reaches the off position operating windings IM, CR, IDF, IIR, I2R and IAS will be deenergized and accordingly contacts IMI, ICR, IDF2, IIRI and I2RI will be disengaged while contacts IDFI and IASI will be engaged. As has been aforeindicated the contacts IVR will be initially in disengaged position following return of the master switch to the off position.

Thereafter the control system functions exactly the same as described for dynamic braking operation following power operation of the motor in the forward direction. However, when the condenser C discharges the current flow through the exciter field will be in the opposite direction due to change in the polarity of the condenser charge.

Preferably relay VR is of the adjustable type so that it may be adjusted to afford release of the contacts IVR at a desired interval following the establishment of the dynamic braking cycle. Preferably the voltage at which the winding VR becomes deenergized will correspond to the dynamic braking voltage of the motor armature slightly above the point X depicted on the curve AVT of Fig. 2.

It will be apparent to those skilled in the art that the present system of dynamic braking control is equally adapted to a plurality of such motors providing a multi motor drive as disclosed in the aforementioned application. Likewise it will be apparent that the present system of control may be also adapted to control of unidirectional type motors.

What I claim as new and desire to secure by Letters Patent is:

1. The method of increasing the braking action of a motor which for power operation has its field winding connected in series with its armature and which for dynamic braking has its field winding separately excited by a suitably driven exciter whose field strength tends to decrease with slow down of the motor armature, comprising the steps of accumulating electrical energy during power operation of the motor, and then as an incident to slow down of the motor during dynamic braking, discharging such accumulated electrical energy through the exciter field winding.

2. The method of effecting dynamic braking action of a motor reversible by armature reversals and having a series field winding which for dynamic braking is separately excited by an exciter, comprising the steps of driving in opposite directions selectively according to the direction of operation of the motor the exciter for said field winding, accumulating during power operation of the motor electrical energy to discharge in opposite directions selectively according to the direction of motor operation, and progressively connecting a field winding of the exciter across the terminals of the motor armature and effecting discharge through the exciter field winding of the accumulated electrical energy.

3. The method of effecting dynamic braking action of a reversible motor which for power operation has a field winding connected in series with its armature and has its armature reversible, and which for dynamic braking has such field winding separately excited by a suitably driven exciter whose field strength tends to decrease with slow down of the motor armature, comprising the steps of charging a condenser during power operation of the motor, reversing the polarity of charge of the condenser according to the direction of motor operation and then as an incident to slow down of the motor during dynamic braking operation discharging said condenser through a field winding of the exciter.

4. The combination with a motor which for power operation has a field winding connected in series with its armature and which for dynamic braking has said field winding separately excited, of a suitably driven exciter having a field winding to be connected across the motor armature, electrical energy accumulating means, a power circuit, and switch means for establishing selectively power connections and dynamic braking connections for said motor inclusive of the aforesaid exciter field winding connection, the last recited means including means for connecting said accumulating means across the motor armature for charging of the latter means during power operation of the motor and for connecting said accumulating means with said exciter field winding for discharge therethrough as an incident to motor slow down during dynamic braking of the motor whereby increased braking action of the latter is afforded.

5. The combination with a reversible motor which for power operation has a field winding connected in series with its armature and has its armature reversible and which for dynamic braking has said field winding separately excited of a suitably driven exciter having a field to be connected across the motor armature, electrical energy accumulating means, a power circuit and switch means for establishing selectively for said motor power connections and dynamic braking connections including said exciter field winding connection, the last recited means including means for connecting said accumulating means across the motor armature for charging of the latter means during power operation of the motor for polarity of charge varying with the direction of motor operation, and for connecting said accumulating means with said exciter field winding for discharge therethrough as an incident to motor slow down during dynamic braking operation of the motor whereby increased braking action of the latter is afforded.

6. The combination with a motor which for power operation has a field winding connected in series with its armature and which for dynamic braking has said field winding separately excited, of a suitably driven exciter having a field winding to be connected across the motor armature, electrical energy accumulating means, a power circuit, and switch means for establishing selectively power connections and dynamic braking connections for said motor inclusive of the aforesaid exciter field winding connection, the last recited means including means for connecting said accumulating means across the motor armature for charging of the latter means during power operation of the motor, for isolating said accumulating means upon establishment of dynamic braking connections, and for connecting said accumulating means with said exciter field for discharge therethrough as an incident to motor slow down during dynamic braking operation of the motor whereby increased braking action of the latter is afforded.

7. The combination with a reversible motor which for power operation has a field winding connected in series with its armature and has its armature reversible and which for dynamic braking has said field winding separately excited, of a suitably driven exciter having a field to be connected across the motor armature, electrical energy accumulating means, a power circuit and switch means for establishing selectively for said motor power connections and dynamic braking connections including said exciter field winding connection, the last recited means including means for connecting said accumulating means across the motor armature for charging of the latter means during power operation of the motor for polarity of charge varying with the direction of motor operation, for isolating said accumulating means upon establishment of dynamic braking connections, and for connecting said accumulating means with said exciter field for discharge therethrough as an incident to motor slow down during dynamic braking operation of the motor whereby increased braking action of the latter is afforded.

8. The combination with a reversible motor which for power operation has a field winding connected in series with its armature and has its armature reversible and which for dynamic braking has said field winding separately excited, of a suitably driven exciter having a field to be connected across the motor armature, a condenser, a power circuit, and switch means for establishing selectively for said motor power connections and dynamic braking connections including said exciter field winding connection, the last excited means including means for connecting said condenser across the motor armature for charging of said condenser during power operation of the motor for polarity of charge varying with the direction of motor operation, for isolating said condenser upon establishment of braking connections and for connecting said condenser with said exciter field for discharge therethrough as an incident to motor slow down in dynamic braking operation of the motor whereby increased braking action of the latter is afforded.

9. The combination with a motor which for power operation has a field winding connected in series with its armature and which for dynamic braking operation has said field winding separately excited of a suitably driven exciter having a field winding to be connected across the motor armature, a condenser, a power circuit, switch means for establishing selectively for said motor power and dynamic braking connections inclusive of the aforesaid exciter field winding connection, the last recited means comprising a master switch and electroresponsive means subject to control by said master switch, certain of said electroresponsive means providing for connection of said condenser across the motor armature for charging of said condenser during power operation of the motor, and electroresponsive means responsive to the dynamic braking voltage of the motor armature for effecting connection of said condenser in circuit with the exciter field for discharge therethrough as an incident to motor slow down in dynamic braking operation of the motor whereby increased braking action of the latter is afforded.

10. The combination with a reversible motor which for power operation has a field winding connected in series with its armature and has its armature reversible and which for dynamic braking has said field winding separately excited, of a suitably driven exciter having a field to be connected across the motor armature, a condenser, a power circuit, switch means for establishing selectively for said motor power and dynamic braking connections including said exciter field winding connection, the last recited means comprising a master switch and electroresponsive means subject to control by said master switch, certain of said electroresponsive means providing for connection of said condenser across the motor armature for charging of said condenser during power operation of the motor for polarity of charge varying with the direction of motor operation and electroresponsive means responsive to the dynamic braking voltage of the motor armature for establishing connection of said condenser in circuit with the exciter field for discharge therethrough as an incident to motor slow down whereby increased braking action of the latter is afforded.

11. The combination with a reversible motor which for power operation has a field winding connected in series and has its armature reversible and which for dynamic braking has said field winding separately excited, of a suitably driven exciter having a field winding to be connected across the motor armature for dynamic braking, a condenser to be discharged through said exciter field winding upon slow down as a result of dynamic braking, a power circuit, means to connect said motor to said power circuit for reverse operation selectively or alternatively to establish dynamic braking connections for said motor, means associated with the former means to connect said condenser in a closed loop with the armature of said motor when the latter is connected to said power circuit, said loop including opposed unidirectional conducting devices, means under the control of the first mentioned means to exclude said devices from circuit selectively according to the direction of motor operation during power operation of the motor and also during the following dynamic braking, and means disconnecting said condenser from said exciter field winding during power operation of the motor and connecting said condenser to said exciter field winding for discharge therethrough in dynamic braking.

12. The combination with a reversible motor which for power operation has a field winding connected in series and has its armature reversible and which for dynamic braking has said field winding separately excited, of a suitably driven exciter having a field winding to be connected across the motor armature for dynamic braking, a condenser to be discharged through said exciter field winding upon slow down as a result of dynamic braking, a power circuit, a master switch, means under the control of said switch comprising electroresponsive means to connect said motor to said power circuit for reverse operations selectively or alternatively for establishing dynamic braking connections for said motor, electroresponsive means to connect said condenser in a closed loop with the armature of said motor when the latter is connected to said power circuit said loop including opposed unidirectional conducting devices, electroresponsive means to exclude said devices from circuit selectively according to the direction of motor operation during power operation of the motor and also during the following dynamic braking and electroresponsive means to connect said exciter field winding across the motor armature during dynamic braking, and an electroresponsive relay responsive to dynamic braking voltage of the motor armature to connect said condenser in circuit with said exciter field winding for discharge therethrough in dynamic braking.

ROBERT BRUCE BRIDGES.

No references cited.